US012604189B2

(12) United States Patent
Dugoni

(10) Patent No.: US 12,604,189 B2
(45) Date of Patent: Apr. 14, 2026

(54) SYSTEM AND APPARATUS FOR SELECTIVELY LIMITING USER CONTROL OF AN ELECTRONIC DEVICE

(71) Applicant: YONDR, INC., Los Angeles, CA (US)

(72) Inventor: Graham Dugoni, Los Angeles, CA (US)

(73) Assignee: Yondr, Inc., Los Angeles, CA (US)

( * ) Notice: Subject to any disclaimer, the term of this patent is extended or adjusted under 35 U.S.C. 154(b) by 0 days.

(21) Appl. No.: 18/898,900

(22) Filed: Sep. 27, 2024

(65) Prior Publication Data

US 2025/0031042 A1 Jan. 23, 2025

Related U.S. Application Data

(60) Continuation of application No. 18/604,847, filed on Mar. 14, 2024, now Pat. No. 12,133,078, which is a
(Continued)

(51) Int. Cl.
*H04W 12/08* (2021.01)
*H04B 1/3888* (2015.01)
(Continued)

(52) U.S. Cl.
CPC .......... *H04W 12/08* (2013.01); *H04B 1/3888* (2013.01); *H04M 1/667* (2013.01); *H04W 4/02* (2013.01); *H04M 1/185* (2013.01)

(58) Field of Classification Search
CPC ........ H04W 4/02; H04W 12/08; H04M 1/667
(Continued)

(56) References Cited

U.S. PATENT DOCUMENTS 1,597,560 A 8/1926 Solomon
1,803,217 A 4/1931 Clare
(Continued)

FOREIGN PATENT DOCUMENTS

AT 509284 A1 7/2011
AU 2014201391 A1 10/2014
(Continued)

OTHER PUBLICATIONS

Chia-Sheng Tsai and Cheng-I Hung, "An enhanced secure mechanism of access control," 2010 Second International Conference on Communication Systems, Networks and Applications, Hong Kong, 2010, pp. 119-122, doi: 10.1109/ICCSNA.2010.5588756. (Year: 2010).*

(Continued)

*Primary Examiner* — William D Cumming
(74) *Attorney, Agent, or Firm* — Sterne, Kessler, Goldstein & Fox P.L.L.C.

(57) ABSTRACT

A system and apparatus for selectively limiting user control of a mobile electronic device are provided. In an embodiment, the apparatus may be a case sized to receive a mobile electronic device, the case having a locking means to at least partially secure an opening thereof. When engaged, the locking means may be physically impenetrable by the user of the mobile electronic device and may further be configured to engage and disengage in the presence of one or more pre-determined conditions. For example, the lock may engage when the case is detected within a certain geographical region or even during a specified time. It is contemplated that providing disclosed systems and apparatuses may reduce undesirable behavior at communal events by eliminating distractions posed by mobile electronic devices and preventing unauthorized recordings, which together may
(Continued)

enhance overall engagement at and enjoyment of such events.

9 Claims, 4 Drawing Sheets

Related U.S. Application Data continuation of application No. 18/517,675, filed on Nov. 22, 2023, which is a division of application No. 16/813,437, filed on Mar. 9, 2020, now Pat. No. 12,133,074, which is a continuation of application No. 15/704,425, filed on Sep. 14, 2017, now Pat. No. 10,623,957, which is a continuation of application No. 14/692,530, filed on Apr. 21, 2015, now Pat. No. 9,819,788.

(51) Int. Cl.
*H04M 1/667* (2006.01)
*H04W 4/02* (2018.01)
*H04M 1/18* (2006.01)

(58) Field of Classification Search
USPC ........................................... 340/539.1, 572.1
See application file for complete search history.

(56) References Cited

U.S. PATENT DOCUMENTS 2,113,864 A 4/1938 Soref et al.
2,685,002 A 7/1954 Reilly
2,854,132 A 9/1958 Rauier et al.
3,200,868 A 8/1965 Strayer
3,759,073 A 9/1973 Rifkin
3,774,369 A * 11/1973 Klar ........................ B65B 29/04 53/232
3,851,505 A 12/1974 Wilkinson
3,851,506 A * 12/1974 Simon .................. A24F 15/005 70/271
3,858,280 A 1/1975 Martens
4,008,914 A 2/1977 Anderson
4,062,207 A 12/1977 Bonner
4,112,990 A 9/1978 Anderson
4,306,745 A 12/1981 Wenk
4,343,164 A 8/1982 Bako
4,602,405 A 7/1986 Sturman et al.
4,660,874 A 4/1987 Rifkin
4,677,654 A 6/1987 Lagin et al.
4,783,978 A 11/1988 Vallerga
4,790,417 A 12/1988 Tomikawa et al.
4,863,003 A * 9/1989 Carter ...................... A45C 9/00 297/118
4,995,656 A 2/1991 Akashi
5,061,086 A 10/1991 Vallerga
5,217,119 A 6/1993 Hollingsworth
5,233,656 A 8/1993 Langrand et al.
5,426,419 A * 6/1995 Nguyen .............. E05B 73/0064 70/57.1
5,426,491 A 6/1995 Landa et al.
5,483,224 A 1/1996 Rankin et al.
5,586,168 A 12/1996 Bucalo et al.
5,631,947 A 5/1997 Wittstein et al.
5,645,205 A 7/1997 Kennedy
5,681,115 A * 10/1997 Diederich .......... B65D 33/2541 383/97
5,775,812 A 7/1998 St. Phillips et al.
5,816,459 A 10/1998 Armistead
5,950,816 A 9/1999 Reid
5,960,952 A 10/1999 Chen
5,977,876 A * 11/1999 Coleman ................ A45C 13/10 340/539.31
6,029,482 A * 2/2000 Rifkin .................. A44B 19/301 109/43
6,057,779 A 5/2000 Bates
6,068,119 A 5/2000 Derr et al.
6,161,959 A 12/2000 Abraham
6,182,878 B1 2/2001 Racca
6,218,929 B1 4/2001 Furuta et al.
6,223,896 B1 5/2001 Bell et al.
6,286,999 B1 9/2001 Cappel et al.
6,354,122 B1 3/2002 Snoke
6,435,392 B1 8/2002 Kennedy
6,456,487 B1 9/2002 Hetterick
6,499,638 B2 12/2002 Campbell
6,533,335 B2 3/2003 Hudson
6,608,548 B1 8/2003 Pellaton et al.
6,651,854 B1 11/2003 Lacoste
6,657,214 B1 12/2003 Foegelle et al.
6,767,131 B2 7/2004 Taheri
6,792,260 B1 9/2004 Ezuriko
6,806,807 B2 10/2004 Cayne et al.
6,864,791 B1 3/2005 Kam
6,896,133 B2 * 5/2005 Spagna .............. G11B 33/0427 70/57.1
7,069,753 B2 7/2006 Schlipper
7,075,798 B2 7/2006 Hendrickson
7,119,684 B2 10/2006 Petersen et al.
7,181,229 B2 2/2007 Singh et al.
7,200,420 B2 4/2007 Rankin
7,277,726 B2 10/2007 Ahya et al.
7,367,482 B1 5/2008 Witherspoon, Jr.
7,515,708 B1 4/2009 Doty, III et al.
7,536,562 B2 5/2009 Little et al.
7,609,512 B2 10/2009 Richardson et al.
7,772,504 B1 8/2010 Tashjian
7,961,914 B1 6/2011 Smith
8,103,042 B2 1/2012 Tan et al.
8,145,199 B2 3/2012 Tadayon
8,256,012 B2 8/2012 Little et al.
8,479,922 B2 7/2013 Kennedy
8,496,106 B1 7/2013 Bigg
8,544,646 B2 * 10/2013 Bouhraoua ............ G16H 20/13 340/572.1
8,570,737 B2 10/2013 Rayner
8,669,870 B2 3/2014 Jung et al.
8,698,627 B2 4/2014 Londo et al.
8,724,814 B2 5/2014 Little et al.
8,868,931 B2 10/2014 Little et al.
8,887,044 B1 11/2014 Goodspeed et al.
8,950,223 B1 2/2015 Joyce
9,115,944 B2 8/2015 Arif
9,124,703 B2 9/2015 Tadayon
9,154,486 B1 10/2015 Saylor et al.
9,332,126 B2 5/2016 Tadayon
9,345,300 B2 5/2016 Park
9,384,369 B2 7/2016 Dong
9,545,146 B1 1/2017 King
9,661,501 B2 5/2017 Choi
9,819,788 B2 11/2017 Dugoni
9,871,548 B2 1/2018 Hangsleben
9,971,902 B2 5/2018 Lee
9,992,884 B2 6/2018 Williams
10,082,835 B2 9/2018 Hangsleben
10,225,738 B2 3/2019 Shimizu
10,236,929 B2 3/2019 Hangsleben
10,623,957 B2 4/2020 Dugoni
10,980,324 B2 4/2021 Nguyen
12,049,715 B2 * 7/2024 Martin ..................... A45C 3/06
12,089,724 B2 * 9/2024 Wienberg ................. A45F 3/04
12,133,074 B2 10/2024 Dugoni
12,133,078 B2 * 10/2024 Dugoni ................. H04W 12/08
2002/0070566 A1 6/2002 Hudson
2002/0130777 A1 9/2002 Besnard
2003/0011455 A1 1/2003 Wakuda et al.
2003/0011466 A1 1/2003 Samuel et al.
2003/0198407 A1 10/2003 Rehwinkel et al.
2003/0209604 A1 11/2003 Harrison
2004/0022455 A1 2/2004 Reason
2004/0031708 A1 * 2/2004 Spagna .............. G11B 33/0427
2004/0047522 A1 * 3/2004 Thibault ............... D06F 95/002 383/22
2004/0083782 A1 5/2004 Lantz

(56) References Cited

U.S. PATENT DOCUMENTS

2004/0117651 A1 6/2004 Little et al.
2004/0117956 A1 6/2004 Benjamins
2004/0166910 A1 8/2004 Ha et al.
2004/0256432 A1 12/2004 Orenstein
2005/0031228 A1 2/2005 Galomb et al.
2005/0040931 A1 2/2005 Shitan
2005/0164753 A1 7/2005 Kato
2005/0205622 A1 9/2005 Liu
2005/0225445 A1 10/2005 Petersen et al.
2006/0274493 A1 12/2006 Richardson
2007/0110416 A1 5/2007 Yamaguchi et al.
2007/0142068 A1 6/2007 Matsuo
2007/0180873 A1 8/2007 Yen et al.
2007/0201181 A1 8/2007 Dubrule et al.
2008/0073192 A1 3/2008 Lee
2008/0164267 A1 7/2008 Huber
2008/0191867 A1 8/2008 Markovich
2008/0237232 A1 10/2008 Cohn et al.
2009/0014105 A1 1/2009 Shattuck
2009/0226050 A1 9/2009 Hughes
2009/0228720 A1 9/2009 Little et al.
2010/0270070 A1 10/2010 Bradley
2010/0326864 A1 12/2010 Campbell
2011/0142372 A1 6/2011 Blonden et al.
2011/0225849 A1 9/2011 Zubyk
2011/0312394 A1 12/2011 Jeon
2012/0000908 A1 1/2012 So
2012/0037524 A1 2/2012 Lonsdale, II et al.
2012/0037536 A1 2/2012 Lonsdale, II et al.
2012/0061134 A1 3/2012 Kennedy
2012/0069503 A1 3/2012 Lauder et al.
2012/0118773 A1 5/2012 Rayner
2012/0180271 A1 7/2012 Avganim
2012/0187003 A1* 7/2012 Stewart ................ G08B 13/126 340/654
2012/0212430 A1 8/2012 Jung et al.
2012/0213454 A1 8/2012 Price et al.
2012/0217275 A1 8/2012 Yu
2012/0269461 A1 10/2012 Proctor et al.
2012/0285737 A1 11/2012 Judy et al.
2012/0298018 A1 11/2012 McCabe
2012/0305428 A1* 12/2012 Bouhraoua ............ B65D 55/14 206/438
2013/0057694 A1 3/2013 Petricoin, Jr.
2013/0077896 A1 3/2013 Wiley et al.
2013/0121621 A1 5/2013 Misner
2013/0126531 A1 5/2013 Hynecek et al.
2013/0145439 A1 6/2013 Lee
2013/0155610 A1 6/2013 Schroeder
2013/0215254 A1 8/2013 Jeon
2013/0220841 A1 8/2013 Yang
2013/0243354 A1 9/2013 Lytle
2013/0256173 A1 10/2013 Sabbah
2013/0277101 A1 10/2013 Judy
2013/0322013 A1 12/2013 Steele
2014/0041425 A1 2/2014 Pinzon
2014/0128131 A1 5/2014 Sin
2014/0183066 A1 7/2014 Toulotte
2014/0190841 A1 7/2014 Nash
2014/0265762 A1 9/2014 Murphy et al.
2014/0283018 A1 9/2014 Dadu et al.
2014/0298492 A1 10/2014 Simpson
2014/0332441 A1 11/2014 Jayetileke et al.
2014/0334748 A1 11/2014 Sasaki et al.
2014/0366250 A1 12/2014 Barone et al.
2014/0366421 A1 12/2014 Arif
2015/0000571 A1 1/2015 Stemen
2015/0042575 A1 2/2015 Dong
2015/0047105 A1 2/2015 Fonzo
2015/0052617 A1 2/2015 Zar
2015/0207907 A1 7/2015 Eisele et al.
2015/0280767 A1 10/2015 Ames et al.
2015/0351513 A1 12/2015 Park, II
2015/0374076 A1* 12/2015 Theobald ............. A44B 19/303 24/419
2016/0140358 A1 5/2016 Lee
2016/0309008 A1 10/2016 Hangsleben
2016/0316053 A1 10/2016 Dugoni
2017/0220073 A1 8/2017 Hangsleben
2018/0167099 A1 6/2018 Hangsleben
2018/0341359 A1 11/2018 Khajeh et al.
2019/0082321 A1 3/2019 Dugoni
2019/0231043 A1* 8/2019 Walter .................... B31B 70/68
2020/0213850 A1 7/2020 Dugoni
2021/0124848 A1 4/2021 Cronk et al.
2021/0307466 A1* 10/2021 Martin ..................... D04B 1/12
2023/0180919 A1* 6/2023 Wienberg ................. A45F 3/04 224/153
2024/0089734 A1 3/2024 Dugoni
2024/0224034 A1* 7/2024 Dugoni ................. H04W 12/08

FOREIGN PATENT DOCUMENTS

AU 2021101508 A4 5/2021
BR 202012030210 U2 9/2014
CA 2806801 A1 8/2013
CH 696577 A5 8/2007
CN 104337179 A 2/2015
DE 9215448 U1 3/1994
DE 19828193 A1 1/2000
DE 20209610 U1 11/2002
DE 102013005487 A1 10/2014
EP 0043726 A1 1/1982
EP 1311170 B1 3/2008
EP 2006759 A2 12/2008
EP 2144208 A1 1/2010
EP 2243389 A1 10/2010
EP 2144208 B1 3/2011
EP 2603025 A1 6/2013
EP 2631754 A1 8/2013
EP 2631754 A9 10/2013
EP 2728762 A2 5/2014
EP 2631754 B1 4/2017
FR 2304302 A1 10/1976
FR 2551029 A1 3/1985
FR 2752370 A1 2/1998
FR 2998145 A1 5/2014
GB 1503829 A 3/1978
GB 2364524 A 1/2002
GB 2395304 A 5/2004
GB 2462725 A 2/2010
GB 2482931 A 2/2012
KR 200366131 Y1 11/2004
KR 20050119726 A 12/2005
KR 20070041248 A 4/2007
KR 20090001715 U 2/2009
KR 20100128940 A 12/2010
KR 20140057462 A 5/2014
KR 101515143 B1 4/2015
KR 20160019333 A 2/2016
WO 0051315 A1 8/2000
WO 03101245 A1 12/2003
WO 2004092037 A1 10/2004
WO 2007110653 A2 10/2007
WO 2009058093 A1 5/2009
WO 2012099708 A1 7/2012
WO 2013078060 A1 5/2013
WO 2014023527 A1 2/2014
WO 2014033374 A1 3/2014
WO 2014122001 A1 8/2014
WO 2014209011 A1 12/2014
WO 2015058213 A1 4/2015

OTHER PUBLICATIONS

Declaration of Dr. Gregory D. Buckner in Support of Petition for Post Grant Review of U.S. Pat. No. 12,133,078, 154 pages.

Defendants' Opening Claim Construction Memorandum, Civil Action No. 1:24-cv-01326, *Yondr, Inc.* v. *Be Smarter, LLC and James Guerra*, United States District Court Western District of Texas Austin Division, Filed Jun. 6, 2025, 26 Pages.

Defendants' Reply Claim Construction Memorandum, Civil Action No. 1:24-cv-01326, *Yondr, Inc.* v. *Be Smarter, LLC and James*

(56) References Cited

OTHER PUBLICATIONS

*Guerra*, United States District Court Western District of Texas Austin Division, Filed Jul. 11, 2025, 16 Pages.
Petition for Post-Grant Review of U.S. Pat. No. 12,133,078 B2, *Be Smarter, LLC and James Guerra*, V. *Yondr, Inc*., PGR2025-0070, 90 Pages.
Prosecution History of U.S. Pat. No. 9,819,788 B2, Granted Nov. 14, 2017, 193 Pages.
Prosecution History of U.S. Pat. No. 12,133,078 B2, Granted Oct. 29, 2024, 248 Pages.
Yondr, Inc.'S Responsive Claim Construction Brief, Case No. 1:24-cv-01326-ADA, *Yondr, Inc*. v. *Be Smarter, LLC and James Guerra*, United States District Court Western District of Texas Austin Division, Filed Jun. 27, 2025, 27 Pages.
Greenberg Traurig (NY), Third Party Submission under U.S. Appl. No. 18/517,675, filed Nov. 22, 2023, 184 Pages.
Alamy, "1980s Mobile Phone Breifcase Stack Photos and Images," (Jun. 2024), 4 Pages.
International Search Report and Written Opinion for International Application No. PCT/US2024/017945, mailed on Jun. 10, 2024, 11 pages.
Defendants' Preliminary Invalidity Contentions Exhibit B-12 Claim Chart Metcalf 304, Apr. 14, 2025, 7 Pages.
Defendants' Preliminary Invalidity Contentions Exhibit B-13 Claim Chart Farmer 725, Apr. 14, 2025, 6 Pages.
Defendants' Preliminary Invalidity Contentions Exhibit B-14 Claim Chart Markovich 867, Apr. 14, 2025, 11 Pages.
Defendants' Preliminary Invalidity Contentions Exhibit B-15 Claim Chart Joyce 223, Apr. 14, 2025, 7 Pages.
Defendants' Preliminary Invalidity Contentions Exhibit B-16 Claim Chart Bates 779, Apr. 14, 2025, 7 Pages.
Defendants' Preliminary Invalidity Contentions Exhibit B-17 Claim Chart Kennedy 922, Apr. 14, 2025, 5 Pages.
Defendants' Preliminary Invalidity Contentions Exhibit B-18 Claim Chart Kennedy II, Apr. 14, 2025, 7 Pages.
Defendants' Preliminary Invalidity Contentions Exhibit B-19 Claim Chart Theobald 001, Apr. 14, 2025, 11 Pages.
Complaint in Case No. 2024-CV-1326 pending in the Western District of Texas, Austin Division ("Complaint"); filed Oct. 31, 2024; 83 Pages.
Defendants' Answer, Affirmative Defenses, and Counterclaims in Response to Yondr, Inc.'s Complaint, in Case No. 2024-CV-1326 pending in the Western District of Texas, Austin Division; filed Dec. 13, 2024; 118 Pages.
Defendant Be Smarter's First Amended Counterclaims, in Case No. 2024-CV-1326 pending in the Western District of Texas, Austin Division; filed Jan. 31, 2025; 140 Pages.
Counterclaim Defendant's Answer to Counterclaim Plaintiff's First Amended Counterclaims, in Case No. 2024-CV-1326 pending in the Western District of Texas, Austin Division; filed Feb. 14, 2025; 14 Pages.
Defendant's Opening Claim Construction Memorandum, in Case No. 2024-CV-1326 pending in the Western District of Texas, Austin Division; filed Jun. 6, 2025; 252 Pages.
Yondr, Inc.'s Responsive Claim Construction Brief, in Case No. 2024-CV-1326 pending in the Western District of Texas, Austin Division; filed Jun. 27, 2025; 56 Pages.
Plaintiff's Disclosure of Asserted Claims and Infringement Contentions, in Case No. 2024-CV-1326 pending in the Western District of Texas, Austin Division; dated Mar. 7, 2025; 79 Pages.
Petition for Inter Partes Review of U.S. Pat. No. 9,819,788 B2, IPR2025-00970, filed May 6, 2025; 69 Pages.
Curriculum Vitae of Gregory Buckner, Exhibit 1003 in IPR2025-00970, filed May 6, 2025; 18 Pages.
Declaration of Gregory Buckner, Exhibit 1003 in IPR2025-00970, dated Apr. 9, 2025; 89 Pages.
Prosecution History of U.S. Pat. No. 9,819,788 B2, Exhibit 1004 in IPR2025-00970, filed Apr. 21, 2015; 193 Pages.
Plaintiff's Second Amended Complaint in Case No. 5:21-CV-2105 pending in the Central District of California; filed Aug. 23, 2022; 21 Pages.
Defendant's Answer to Second Amended Complaint in Case No. 5:21-CV-2105 pending in the Central District of California; filed Oct. 27, 2022; 15 Pages.
Koch IP Party Ltd, Third Party Observation for Application No. EP20230827979, dated Apr. 30, 2025, 26 Pages.
Douglas, Win Elements' Invalidity Contentions Case No. 2:24-cv-09311-JLS-E, Dated Mar. 14, 2021. 23 Pages.
Douglas, Win Elements' Invalidity Contentions Exhibit A Claim Chart Stewart 003, Mar. 14, 2025, 36 pages.
Douglas, Win Elements' Invalidity Contentions Exhibit B Claim Chart Besnard 777, Mar. 14, 2025, 42 pages.
Douglas, Win Elements' Invalidity Contentions Exhibit C Claim Chart Simpson 492, Mar. 14, 2025, 105 pages.
Douglas, Win Elements' Invalidity Contentions Exhibit D Claim Chart Shin 248, Mar. 14, 2025, 83 pages.
Greenberg Traurig (NY), Third Party Submissions under U.S. Appl. No. 18/951,790, Dated Apr. 9, 2025, 499 pages.
Counterclaim Plaintiff's Disclosure of Asserted Claims and Infringement Contentions Case No. 2:24-cv-09311-JLS-E, United States District Court Central District Of California Western Division Dated Jan. 24, 2025, 40 Pages.
Summons In A Civil Action, *Win Elements LLC* v. *YONDR, INC*., Case No. 2:24-cv-09311-JLS-E, United States District Court Central District Of California, Dated Oct. 29, 2024, 2 Pages.
Defendant's Answer to Plaintiff's Complaint and Defendant's Counterclaims, *Win Elements LLC* v. *YONDR, INC*., Case No. 2:24-cv-09311-JLS-E, United States District Court Central District Of California, Dated Nov. 25, 2024.59 Pages.
First Amendment Complaint Against YONDR., *Win Elements LLC* v. *Yondr, Inc*., Case No. 2:24-cv-09311-JLS-E, United States District Court Central District Of California Western Division, Dated Dec. 16, 2024. 339 Pages.
Defendant's Answer to Plaintiffs' First Amended Complaint and Defendants Counterclaims, *Win Elements LLC* v. *YONDR, INC*., Case No. 2:24-cv-09311-JLS-E, United States District Court Central District Of California Western Division,Filed Jan. 13, 2025, 67 Pages.
Counterclaim Defendants' Answer to Counterclaim Plaintiffs Counterclaims, *Win Elements LLC* v. *YONDR, INC*., Case No. 2:24-cv-09311-JLS-E,United States District Court Central District Of California Western Division, Dated Feb. 3, 2025, 11 Pages.
YONDR'S Opening Claim Construction Brief, *Win Elements LLC* v. *YONDR, INC*., Case No. 2:24-cv-09311-JLS-E, United States District Court Central District Of California Western Division, Dated May 23, 2025, 23 Pages.
Declaration Of Frederic M. Douglas In Support Of Plaintiffs' Opening Claim Construction Brief, *Win Elements LLC* v. *YONDR, INC*., Case No. 2:24-cv-09311-JLS-E,United States District Court Central District Of California Western Division, Dated May 23, 2025, 3 Pages.
Appendix Of Exhibits For Plaintiffs' Opening Claim Construction Brief, *Win Elements LLC* v. *YONDR, INC*., Case No. 2:24-cv-09311-JLS-E, United States District Court Central District Of California Western Division, Dated May 23, 2025, 119 Pages.
Plaintiffs' Opening Claim Construction Construction Brief, *Win Elements LLC* v. *YONDR, INC*., Case No. 2:24- cv-09311-JLS-E, United States District Court Central District, Dated May 23, 2025, 35 Pages.
Defendant's Opening Brief On Its Motion To Dismiss Under Federal Rule Of Civil Procedure 12(H)(3),*Win Elements LLC* v. *YONDR, INC*., Case No. 2:24-cv-09311-JLS-E, United States District Court Central District Of California Western Division, Dated Jun. 4, 2025, 12 Pages.
Declaration Of Jeremiah Helm In Support Of Defendant's Motion To Dismiss Under Federal Rule Of Civil Procedure 12 (H)(3), *Win Elements LLC* v. *YONDR, INC*., Case No. 2:24-cv-09311-JLS-E, United States District Court Central District Of California Western Division, Dated Jun. 4, 2025, 27 Pages.
Declaration Of Jeremiah Helm In Support Of Yondr's Responsive Claim Construction Brief, *Win Elements LLC* v. *YONDR, INC*.,

(56) References Cited

OTHER PUBLICATIONS

Case No. 2:24-cv-09311-JLS-E, United States District Court Central District Of California Western Division, Dated Jun. 6, 2025, 40 Pages.
YONDR, INC.'S, Response To Plaintiffs' Technology Tutorial, *Win Elements LLC* v. *YONDR, INC.*, Case No. 2:24-cv-09311-JLS-E, United States District Court Central District Of California Western Division, Dated Jun. 6, 2025, 6 Pages.
Plaintiffs' Responsive Claim Construction Brief, *Win Elements LLC* v. *YONDR, INC.*, Case No. 2:24-cv-09311-JLS-E, United States District Court Central District Of California, Dated Jun. 6, 2025, 19 Pages.
Plaintiffs' Written Response To Defendant YONDR, INC.'S Technology Tutorial, *Win Elements LLC* v. *YONDR, INC.*, Case No. 2:24-cv-09311-JLS-E, United States District Court Central District Of California, Dated Jun. 6, 2025, 7 Pages.
Defendants' Preliminary Invalidity Contentions Case No. 1:24-cv-01326-ADA, Dated Apr. 14, 2025, 26 Pages.
Defendants' Preliminary Invalidity Contentions Exhibit A-1 Claim Chart Samuel 466, Apr. 14, 2025, 13 Pages.
Defendants' Preliminary Invalidity Contentions Exhibit A-2 Claim Chart Shin 248, Apr. 14, 2025, 8 Pages.
Defendants' Preliminary Invalidity Contentions Exhibit A-3 Claim Chart Simpson 492, Apr. 14, 2025, 9 Pages.
Defendants' Preliminary Invalidity Contentions Exhibit A-4 Claim Chart Stewart 003, Apr. 14, 2025, 7 Pages.
Defendants' Preliminary Invalidity Contentions Exhibit A-5 Claim Chart Campbell 638, Apr. 14, 2025, 5 Pages.
Defendants' Preliminary Invalidity Contentions Exhibit A-6 Claim Chart Furuta 929, Apr. 14, 2025, 5 Pages.
Defendants' Preliminary Invalidity Contentions Exhibit A-7 Claim Chart Pellaton 548, Apr. 14, 2025, 4 Pages.
Defendants' Preliminary Invalidity Contentions Exhibit A-9 Claim Chart Pinzon 425, Apr. 14, 2025, 5 Pages.
Defendants' Preliminary Invalidity Contentions Exhibit A-10 Claim Chart Coleman 876, Apr. 14, 2025, 4 Pages.
Defendants' Preliminary Invalidity Contentions Exhibit A-11 Claim Chart Smith 914, Apr. 14, 2025, 5 Pages.
Defendants' Preliminary Invalidity Contentions Exhibit A-12 Claim Chart Metcalf 304, Apr. 14, 2025, 5 Pages.
Defendants' Preliminary Invalidity Contentions Exhibit A-13 Claim Chart Farmer 725, Apr. 14, 2025, 5 Pages.
Defendants' Preliminary Invalidity Contentions Exhibit A-14 Claim Chart Markovich 867, Apr. 14, 2025, 9 Pages.
Defendants' Preliminary Invalidity Contentions Exhibit A-15 Claim Chart Joyce 223, Apr. 14, 2025, 7 Pages.
Defendants' Preliminary Invalidity Contentions Exhibit A-16 Claim Chart Bates 779, Apr. 14, 2025, 5 Pages.
Defendants' Preliminary Invalidity Contentions Exhibit A-17 Claim Chart Kennedy 922, Apr. 14, 2025, 4 Pages.
Defendants' Preliminary Invalidity Contentions Exhibit A-18 Claim Chart Kennedy II 134, Apr. 14, 2025, 4 Pages.
Defendants' Preliminary Invalidity Contentions Exhibit B-1 Claim Chart Samuel 466, Apr. 14, 2025, 13 Pages.
Defendants' Preliminary Invalidity Contentions Exhibit B-2 Claim Chart Shin 466, Apr. 14, 2025, 13 Pages.
Defendants' Preliminary Invalidity Contentions Exhibit B-3 Claim Chart Simpson 492, Apr. 14, 2025, 14 Pages.
Defendants' Preliminary Invalidity Contentions Exhibit B-4 Claim Chart Stewart 003, Apr. 14, 2025, 8 Pages.
Defendants' Preliminary Invalidity Contentions Exhibit B-5 Claim Chart Campbell 638, Apr. 14, 2025, 8 Pages.
Defendants' Preliminary Invalidity Contentions Exhibit B-6 Claim Chart Furuta 929, Apr. 14, 2025, 8 Pages.
Defendants' Preliminary Invalidity Contentions Exhibit B-7 Claim Chart Pellaton 548, Apr. 14, 2025, 6 Pages.
Defendants' Preliminary Invalidity Contentions Exhibit B-9 Claim Chart Pinzon 425, Apr. 14, 2025, 6 Pages.
Defendants' Preliminary Invalidity Contentions Exhibit B-10 Claim Chart Coleman 876, Apr. 14, 2025, 6 Pages.
Defendants' Preliminary Invalidity Contentions Exhibit B-11 Claim Chart Smith 914, Apr. 14, 2025, 6 Pages.
Mathankumar, M., et al., "Multilevel Burglar Clasp," 2024 10th International Conference on Advanced Computing and Communication Systems (ICACCS), pp. 1584-1588, Coimbatore, India (2024).
Modular anti-theft device for portable electronic device, IP.com Disclosure No. IPCOM000242860D Publication Date: Aug. 26, 2015 (2015), 13 pages.

* cited by examiner 100
102
104
106
108
110
112
114
114a
114b 700
102b
102a
702

SYSTEM AND APPARATUS FOR SELECTIVELY LIMITING USER CONTROL OF AN ELECTRONIC DEVICE

CROSS-REFERENCE TO RELATED APPLICATIONS

This application is a continuation of and claims the benefit of priority from U.S. patent application Ser. No. 18/604,847, filed Mar. 14, 2024 (now U.S. Pat. No. 12,133,078), which is a continuation of U.S. patent application Ser. No. 18/517,675, filed Nov. 22, 2023, which is a divisional of U.S. patent application Ser. No. 16/813,437, filed on Mar. 9, 2020 (now U.S. Pat. No. 12,133,074), which is a continuation of U.S. patent application Ser. No. 15/704,425, filed on Sep. 14, 2017 (now U.S. Pat. No. 10,623,957), which is a continuation of U.S. patent application Ser. No. 14/692,530, filed on Apr. 21, 2015 (now U.S. Pat. No. 9,819,788); the contents of which are incorporated herein by reference in their entirety

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to systems and apparatuses for limiting functionality of personal electronic devices and, more particularly, to locking cases and other techniques that selectively limit a user's ability to access and control such electronic devices until predetermined conditions, such as geographic location and passage of time, are met.

BACKGROUND

Handheld and mobile electronic devices have become ubiquitous for conveniently enhancing wireless communication and connectivity. Still, the extent of their pervasive use has also proven to be unwelcome in certain settings.

In many instances, mobile electronic devices can distract users from appreciating their surroundings and company of others to a full extent. For example, many who bring their mobile electronic devices, such as cell phones, to social outings may find themselves foregoing live conversation to check their phones for text messages, missed calls, and other virtual communications. Additionally, as photo and video recording capabilities have improved, users have increasingly taken to using their mobile electronic devices to record performers, speakers, and even athletes at live events. This can be distracting to the performers and to others in the audience, detracting from overall enjoyment of the event. Indeed, this can even be harmful to the intellectual property rights of performers whose copyrighted or otherwise valuable and legally protectable displays and performances are digitally recorded and distributed without authorization.

Attempts have been made to limit use of mobile electronic devices. For example, U.S. Pat. No. 7,181,229 to Singh et al. discloses a system that, in part, shuts off a cell phone and prevents a user from turning the cell phone on while it is within a restricted area, such as a car. This solution is deficient however, because it completely prevents users from being notified of any incoming calls or messages that may require the user's attention. The '229 patent further discloses a system that limits cell phone function when it is detected within an automobile. Aside from the geographically limited application of this invention, it is also deficient because it fails to blocks the screen to diminish possible temptation to use the device.

Other attempts to discourage use of mobile electronic devices at communal events and in certain venues have been largely ineffective. For example, providing signs and instructions to refrain from using mobile electronic devices in certain areas and/or during specified time periods are often ignored. Moreover, requiring people to leave mobile electronic devices at home, turn them off, or to physically turn them over to venue staff for the duration of an event is often met with resistance. This may be because users prefer not to be separated from their valuable personal property, fearing theft of their devices and electronically stored information, and even the risk of missing important messages or other notifications.

Thus, although various proposals have been made to solve the problem, none of those in existence combine the characteristics of the present invention. Therefore, there remains a need for a system and apparatus that selectively limits access to and/or disables functions of a mobile electronic device.

SUMMARY

The present disclosure is directed to techniques for limiting access to and control of personal mobile electronic devices within certain geographic locations or even during specified periods of time.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In one embodiment, among others, the apparatus is a case sized to accommodate a mobile electronic device. More particularly, the case may comprise a front and a rear panel secured together along longitudinally opposed side edges and laterally opposed lower edges. Configured in this manner, the front and rear panels and sealed edges may define an opening to receive the mobile electronic device.

The case may additionally comprise a locking means for at least partially securing the opening. The locking means may comprise opposing plates disposed on or within the front and rear panels of the case. More particularly, opposing plates respectively having securably mateable female and a male members are contemplated. It is additionally contemplated that the locking means may first render the electronic device inaccessible to the user, or in other words possessor, of the device and second be non-disengageable by the user of the mobile electronic device until predetermined condition is met. In other words, when engaged, the locking means may be physically impenetrable by the user of the mobile electronic device and may further be configured to disengage to provide the user with access to his or her mobile electronic device only under certain circumstances.

For example, predetermined condition may relate to geographic location or timing. Indeed, in one embodiment, the case may be used to render a mobile electronic device inaccessible during a communal event such as a show, demonstration, display, or athletic competition within a concert hall, center, arena, or similar venue. In such scenarios, the locking means may only become disengageable if a user leaves the venue. Alternatively, the locking means may only become disengageable at such a time as the communal event is completed. As yet another alternative, the locking means may become disengageable when a user locates venue staff who are equipped to physically disengage the locking means on their behalf.

In an embodiment, the locking means may be remotely engageable and disengageable. The locking means may be equipped with electronic receivers such as a radio frequency identification (RFID) configured to instruct the locking means to alternatively engage and disengage when it receives a signal from a proximity transmitter indicating that the case has respectively entered and exited defined geographical region. Thus, for example, the locking means may receive instructions to lock the device when it is located within an audience seating area of a venue or concert hall. Then, the locking device may receive instructions to unlock the device when it is located outside of the audience area of a venue or concert hall.

In still another embodiment, the locking device may be equipped with a microprocessor configured to receive Bluetooth™ or other wireless data signals from a beacon or transmitter within a defined perimeter. Thus, for example, receipt of a wireless data signal may cause the locking means on the case to engage so that it restricts access to the mobile electronic device housed within the case. In other examples, the absence of a wireless data signal may cause the locking device to engage.

It is contemplated that providing disclosed systems and apparatuses according to the disclosure and claims provided below may reduce undesirable behavior at communal events by eliminating distractions posed by mobile electronic devices and preventing unauthorized recordings, which together may enhance overall engagement at and enjoyment of such events.

Thus, it is an object of the invention to eliminate distractions caused by use of mobile electronic devices at communal events.

It is another object of the invention to prevent users from controlling their mobile electronic devices within certain locations.

It is yet another object of the invention to prevent users from controlling their mobile electronic devices during certain periods of time.

It is still another object of the invention to avoid possible infringement of intellectual property rights caused by unauthorized use of recording features available on many mobile electronic devices.

It is another object of the invention to protect personal privacy of those surrounding users of mobile electronic devices at communal events by preventing such users from photographing and recording them, and even further preventing such users from sharing any impermissibly captured photos and recordings.

One or more of the above-disclosed embodiments, in addition to certain alternatives, are provided in further detail below with reference to the attached figures. The disclosed subject matter is not, however, limited to any particular embodiment disclosed.

Figures 1, 2, 3, 4:
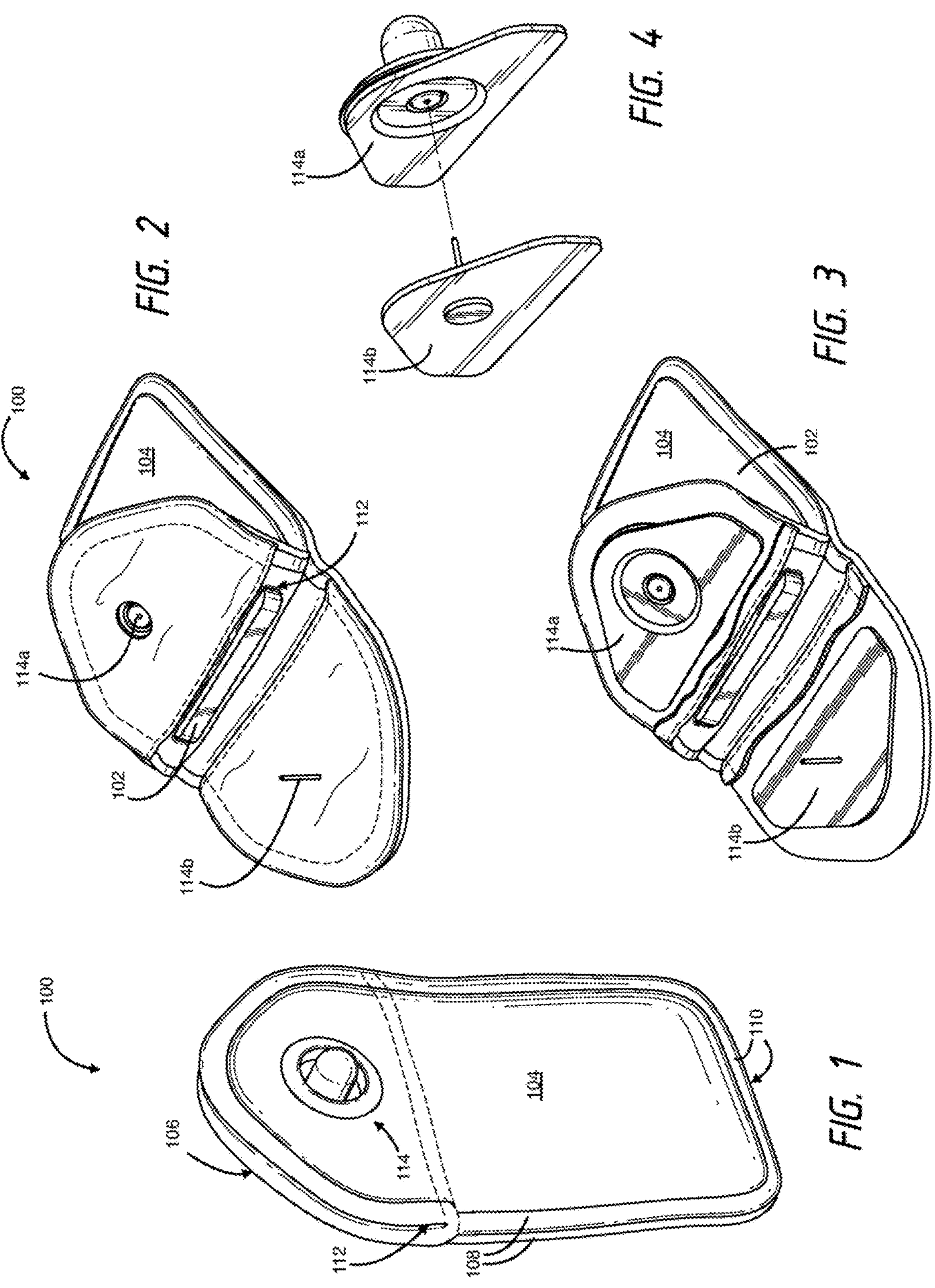
FIG. 1 is a perspective view of an embodiment of the case for selectively limiting user control of an electronic device.
FIG. 2 is an alternate perspective view of an embodiment of the case for selectively limiting user control of an electronic device.
FIG. 3 is a skeletal view of an embodiment of the case for selectively limiting user control of an electronic device.
FIG. 4 illustrates an embodiment of means for locking the embodiment of the case for selectively limiting user control of an electronic device in FIGS. 1-3.

The disclosed embodiments may be better understood by referring to the figures in the attached drawings, as provided below. The attached figures are provided as non-limiting examples for providing an enabling description of the system and apparatus claimed. Attention is called to the fact, however, that the appended drawings illustrate only typical embodiments of this invention and are therefore not to be considered as limiting of its scope. One skilled in the art will understand that the invention may be practiced without some of the details included in order to provide a thorough enabling description of such embodiments.

Well-known structures and functions have not been shown or described in detail to avoid unnecessarily obscuring the description of the embodiments.

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

With reference to FIGS. 1-4 the apparatus for selectively limiting user control of an electronic device may be embodied as a case 100 sized to accommodate a mobile electronic device 102. More particularly, the case may comprise a front 104 and a rear panel 106 secured together along longitudinally opposed side edges 108 and laterally opposed lower edges 110. The lower edges 110 may be secured by permanently stitching or gluing together, while the side edges 108 may be stitched or glued upward from the lower toward an opening 112 that is defined by the front and rear panels 104, 106 and permanently secured edges 108, 110 and further sized to receive the mobile electronic device 102.

As illustrated, one embodiment of the apparatus may be a soft, flexible case. It may comprise various rugged materials such as neoprene, lycra, silicone rubber, spandex, vinyl, canvas, and any other material or combinations of materials sufficient to temporarily house a mobile electronic device. Additionally, various other configurations are contemplated for the shape of the apparatus as well. For example, the invention may comprise a rigid shell or box having a securable opening to receive a mobile electronic device. As such, one skilled in the art will recognize that the illustrated figures are offered by way of example and ease of understanding only, not of limitation.

The apparatus for selectively limiting user control of an electronic device further comprises a locking means 114 for at least partially securing the opening 112 so the mobile electronic device 102 is may be rendered inaccessible to and further incontrollable by the user of the device although it may still remain in his possession.

In one embodiment, the locking means 114 comprises opposing plates disposed on or within the front and rear panels 106, 108 of the case 100, and to effect locking, each opposing plate has one of a securably mateable female **114*a* and male 114*b* member. Other locking means are, of course, contemplated. For example, magnetic plates, selectively releasable mesh, lockable zippers, and other means for at least partially securing the opening 112 may be sufficient to practice the invention. In this manner, the locking means 114 may first render the electronic device 102 inaccessible to the user by at least partially securing the opening 112** of the device, and second be non-disengageable by the user of the mobile electronic device until a predetermined condition is met.

One or more embodiments of the case 100 may be configured to selectively limit access to a mobile electronic device 102 in response to various predetermined conditions. In one embodiment, the case may be outfitted with locking means 114 comprising a manual, key-operated latch wherein means for unlocking comprise a corresponding key. In such an embodiment, the case 100 may be manually locked or unlocked by venue staff or other members in possession of such a key. Thus, the system for selectively limiting user control of an electronic device may involve a predetermined condition requiring the user of the electronic device 102 to locate venue staff or other members in possession of the key to manually unlock the case 100 on user's behalf.

Figures 5, 6:
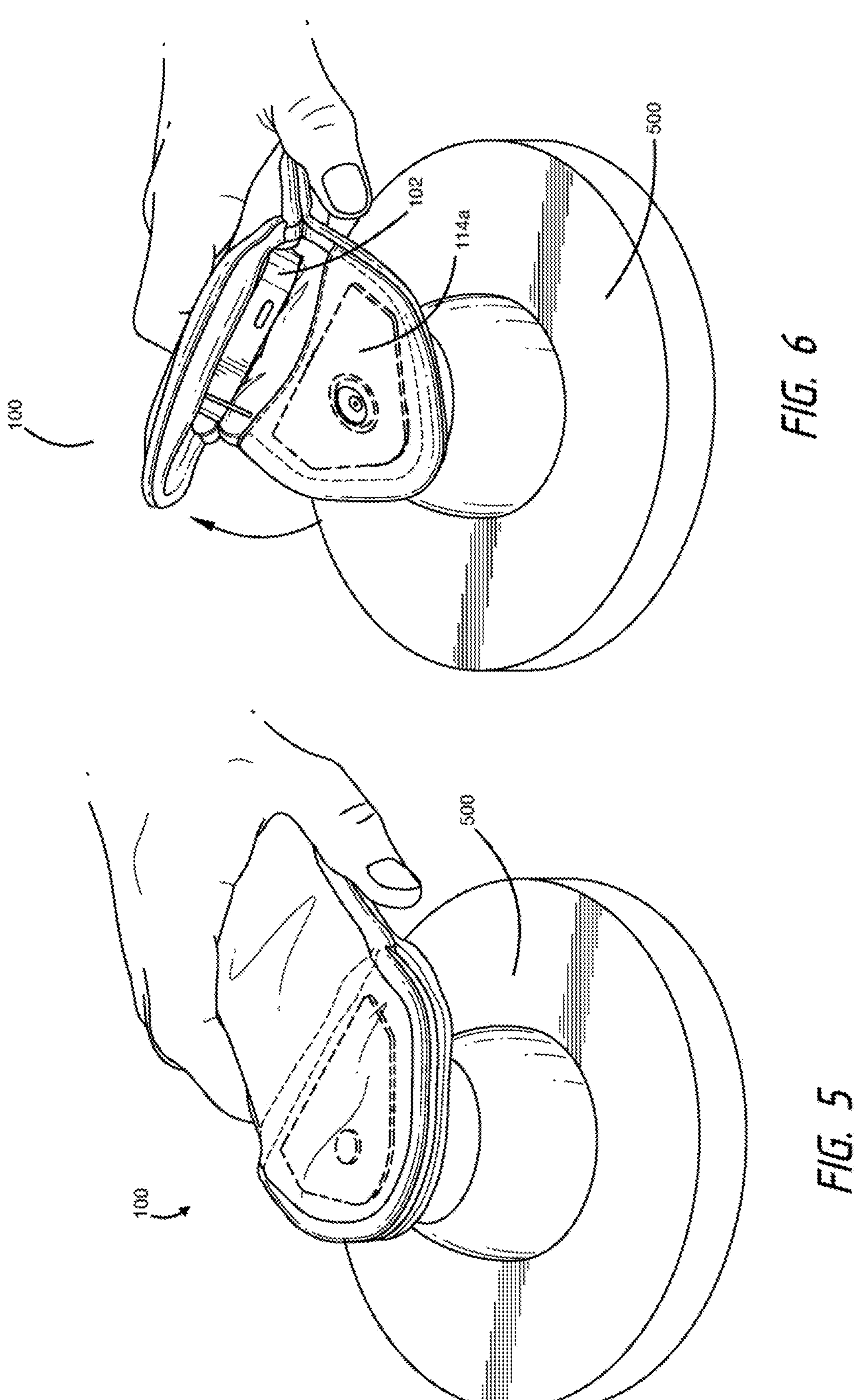
FIGS. 5 and 6 show an embodiment of means for unlocking an embodiment of the case for selectively limiting user control of an electronic device.

With reference to FIGS. 5 and 6, the system 500 for selectively limiting user control of an electronic device may comprise a locking means 114 having electronic receivers, such as a radio frequency identification (RFID) tag and means for unlocking the case 100 comprising an electronic article surveillance (EAS) detacher 502 for separating the mating portions of the locking means 114. The EAS detacher 502 may be, for example, any of those known in the to contain strong magnets that interrupt electromagnetic fields such as those in the range of radio frequencies. Thus, in one embodiment represented by FIG. 5, the at least partially secured locking means 114 may be touched to the EAS detacher 502 so that any electromagnetic fields enabling the locking means 114 to remain secured are interrupted. This, in turn, may allow the locking means 114 to become unsecured and further exposes the mobile electronic device 102 within the case as in FIG. 6. In such an embodiment, it is contemplated that the predetermined condition involves locating an EAS detacher. In the event that the system and apparatus for selectively limiting user control of an electronic device is employed to reduce distractions at a communal event, such means for unlocking the case may be placed out side of any audience viewing area or even at venue exit ways.

Figure 7:
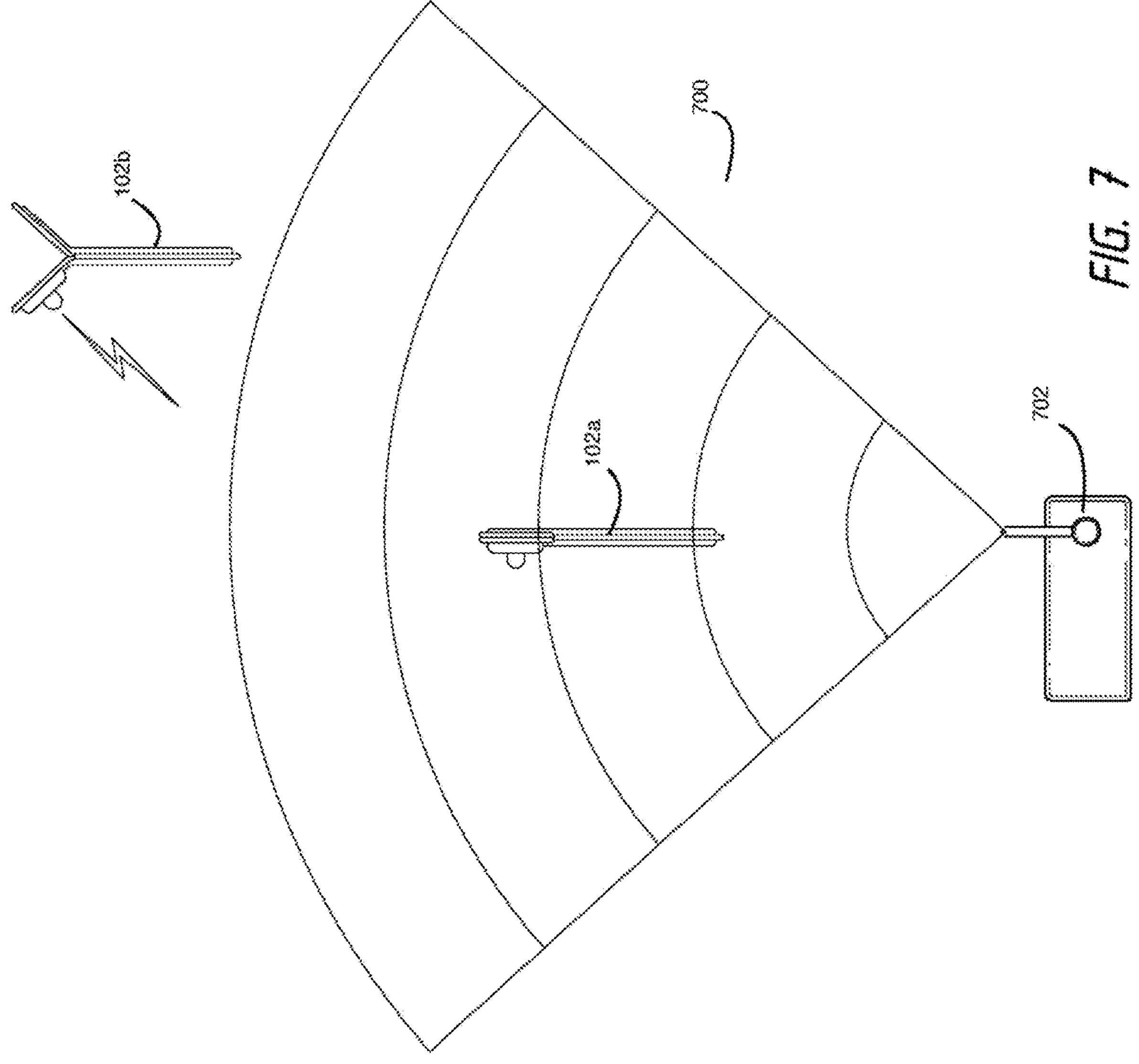
FIG. 7 is a schematic representation of an embodiment of the system for selectively limiting user control of an electronic device.

The means for unlocking the case may also operate remotely to cause the case to automatically lock and unlock. For example, in one embodiment, the locking means may automatically lock and unlock when the case is determined to be, respectively, within and outside of a defined geographical region. For example, with reference to FIG. 7, another embodiment of the system may comprise locking means 114 having electronic receivers such as the aforementioned RFID tag disposed therein and further configured to instruct the locking means to alternatively engage and disengage when it receives a signal from a proximity transmitter 702. Thus, for example, the locking means may receive instructions to lock the device when it is located in 100*a* the geographical region 704 within reach of the transmitter 702. Then, the locking means 114 may receive instructions to unlock the device when it is located outside 100*b* of the geographical region 704 within reach of the transmitter 702. In such an embodiment, it is contemplated that the predetermined condition requires a user to exit a geographical region to regain access and control of his or her mobile electronic device. As a more particularized example, a transmitter signal may be configured to cover the geographical region of an audience seating area at a venue hosting a communal event. When within the audience seating area, the case 100*a* may remain secured so that a user is unable to access or control the mobile electronic device contained therein. However, when the case 100*b* travels outside of the audience seating area, such as to a foyer, lobby, or restroom, the locking means 114 may become unsecured to provide access to the mobile electronic device. It should be understood that such a limitation is offered by way of example only. The transmitter signal may be configured to cover any desirable area, and indeed a plurality of transmitters 702 may even be employed to enlarge or otherwise define the geographical region affecting access and control of the mobile electronic device.

In still another embodiment, the locking device may be equipped with a microprocessor configured to receive Bluetooth™ or other wireless data signals from a beacon or transmitter within a defined perimeter. Thus, for example, receipt of a wireless data signal may cause the locking means on the case to engage so that it restricts access to the mobile electronic device housed within the case. In other examples, the absence of a wireless data signal may cause the locking device to engage.

In addition to geographical proximity to electromagnetic and other wireless data signals, the predetermined condition may also or alternatively relate to the passage of time. For example, the locking means may automatically become unsecured at the time that a communal event is scheduled to end or even during intermissions. Thus a transmitter may produce a signal causing the locking means to remain secured for a period of time. When the period of time elapses, the transmitter may stop producing the signal so that the locking means becomes unsecured. Of course, various other predetermined conditions and means for unlocking may signal or prompt the release of the locking means, and the foregoing are offered only for the purpose of enabling the system and apparatus. In any event, when engaged, the locking means may be physically impenetrable by the user of the mobile electronic device and may further be configured to automatically or manually disengage to provide the user with access to his or her mobile electronic device only under certain circumstances.

In still another embodiment, the mobile electronic device 102 itself includes an embodiment of the system for selectively limiting user control of an electronic device. The system can be implemented in numerous ways such as, for example and without limitation, those discussed above, and even as an application executed on the mobile electronic device 102. In operation, an embodiment of the system receives information from integrated positioning technology, such Global Position Systems (GPS) to selectively limit a user's ability to control his or her mobile electronic device. Of course, one skilled in the art will recognize that various methods of determining the location of a mobile electronic device can be used.

In a further embodiment, a geofence may be created around a venue for a communal event, or other location where it may be desirable to limit use of a mobile electronic device, so that the system automatically disables certain functional capabilities of the mobile electronic device 102 any time the device comes within a predetermined distance of the venue or other location. For example, a mobile electronic device within the geofence may be rendered incapable of sending or receiving voice and/or text messages. As another example, a mobile electronic device within the geofence may be incapable of running applications or other programs operative to capture audio and/or visual recordings. As yet another example, a mobile electronic device within the geofence may be rendered incapable of receiving or transmitting data through the Internet and other networks.

Figure 8:
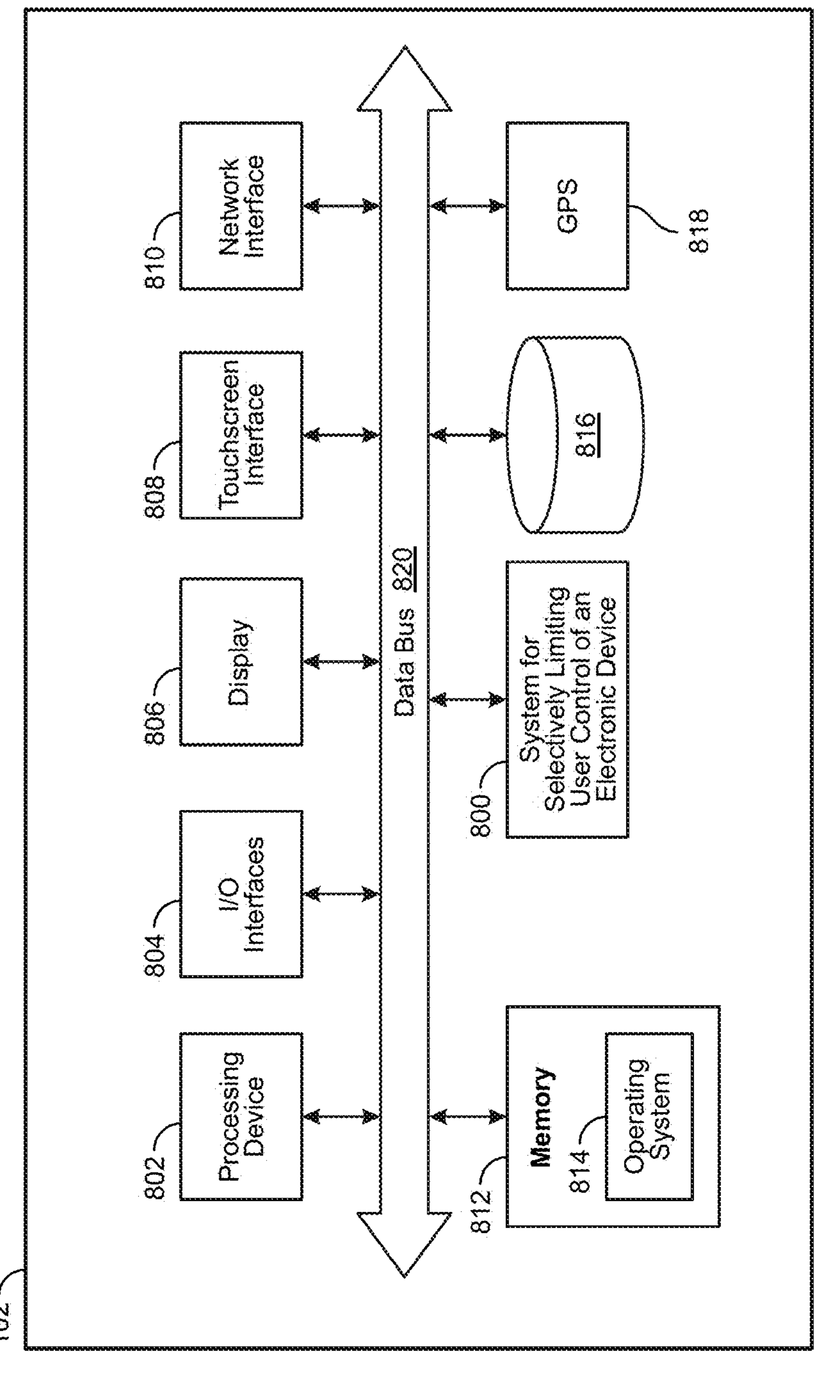
FIG. 8 illustrates an exemplary embodiment of a mobile electronic device practicing an embodiment of the system for selectively limiting user control of the electronic device.

FIG. 8 illustrates an exemplary embodiment of a mobile electronic device 102 that may be compatible with one or more embodiments of the disclosed system and apparatus. The mobile electronic device 102 may be a cell phone, smart phone, or tablet computer but may also be embodied in any one of a wide variety of wired and/or wireless computing devices. As shown in FIG. 8, mobile electronic device 102 includes a processing device (processor) 802, input/output interfaces 804, a display 806, a touchscreen interface 808, a network interface 810, memory 812, and operating system 814, a mass storage 816 and a GPS 818, with each communicating across a local data bus 820. Additionally, mobile electronic device 802 incorporates a system for selectively limiting user control of an electronic device 102, which may optionally be configured to include programming instructions to selectively disable any of the aforementioned features of the mobile electronic device 102. For example, in one embodiment, the system for selectively limiting user control of an electronic device 102 may communicate instructions to disable input/output interfaces 804.

The processing device 802 may include any custom made or commercially available processor, a central processing unit (CPU) or an auxiliary processor among several processors associated with the mobile electronic device 102, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

The memory 812 can include any one of a combination of volatile memory elements (e.g., random-access memory (RAM, such as DRAM, and SRAM, etc.)) and nonvolatile memory elements. The memory typically comprises native operating system 814, one or more native applications, emulation systems, or emulated applications for any of a variety of operating systems and/or emulated hardware platforms, emulated operating systems, etc. For example, the applications may include application specific software which may comprise some or all the components of the mobile electronic device 102. In accordance with such embodiments, the components are stored in memory and executed by the processing device. Note that although depicted separately in FIG. 8, the system selectively limiting user control of an electronic device 102 may be resident in memory such as memory 812.

Touchscreen interface 808 may configured to detect contact within the display area of the display 806 and provides such functionality as on-screen buttons, menus, keyboards, etc. that allows users to navigate user interfaces by touch. Some embodiment of the mobile electronic device 102 will even comprise GPS 818 or other means to determine the location of the mobile electronic device 102.

[One of ordinary skill in the art will appreciate that the memory 814 can, and typically will, comprise other components that have been omitted for purposes of brevity. Note that in the context of this disclosure, a non-transitory computer-readable medium stores one or more programs for use by or in connection with an instruction execution system, apparatus, or device. With further reference to FIG. 8, network interface device 810 comprises various components used to transmit and/or receive data over a networked environment. When such components are embodied as an application, such as an application for executing and embodiment of the system for selectively limiting user control of the electronic device, the one or more components may be stored on a non-transitory computer-readable medium and executed by the processing device.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. For example, communal events are discussed as venues for implementation of the invention, however it is contemplated that the system and apparatus disclosed may be applied to small scale and even private venues such as for example, a private home, a restaurant, members-only club, and even automobile or other vehicle. Accordingly, it is intended that the invention not be limited, except as by the appended claim(s).

The teachings disclosed herein may be applied to other systems and apparatuses, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the system and apparatus for selectively limiting user control of an electronic device with which that terminology is associated. In general, the terms used in the following claims should not be constructed to limit the system and apparatus for selectively limiting user control of an electronic device to the specific embodiments disclosed in the specification unless the above description section explicitly define such terms. Accordingly, the actual scope encompasses not only the disclosed embodiments, but also all equivalent ways of practicing or implementing the disclosed system and apparatus. The above description of embodiments of the system and apparatus for selectively limiting user control of an electronic device is not intended to be exhaustive or limited to the precise form disclosed above or to a particular field of usage.

While specific embodiments of, and examples for, the method, system, and apparatus are described above for illustrative purposes, various equivalent modifications are possible for which those skilled in the relevant art will recognize.

While certain aspects of the method and system disclosed are presented below in particular claim forms, various aspects of the system and apparatus are contemplated in any number of claim forms. Thus, the inventor reserves the right to add additional claims after filing the application to pursue such additional claim forms for other aspects of the system and apparatus for selectively limiting user control of an electronic device.

What is claimed is:

1. A system comprising:

a flexible case comprising:

- a front panel having a lower edge and sides that are longer than the lower edge;
- a rear panel having a lower edge stitched to the front panel's lower edge and having sides that are approximately the same length as the front panel's sides, wherein the front and rear panels' respective sides are closed, thereby forming an opening to a cavity opposite to the lower edges, the cavity sized to receive a user's mobile electronic device, wherein the mobile electronic device is a cell phone or a smart phone; and
- a lock comprising:
  - a pin; and
  - a hole configured to receive the pin, wherein the pin and the hole are configured to lock the case in a closed position as a closure that limits the user's access to their mobile electronic device, wherein the pin and the hole are connected to the respective front and rear panels, spaced from an edge of the respective front and rear panels; and a separate detacher comprising:

a holder; and a magnet within the holder configured to unlock the closure such that, when the closure is brought in contact with the detacher, the lock unlocks.

2. The system of claim 1, wherein the lock further comprises a first plate stitched within the front panel and a second plate stitched within the rear panel.

3. The system of claim 1, wherein the lock is further configured to unlock based on an instruction received from a radio frequency identification (RFID) tag.

4. The system of claim 1, wherein the case further comprises a microprocessor and wherein the lock is further configured to unlock based on an instruction received from the microprocessor.

5. The system of claim 1, wherein the lock is further configured to unlock based on a predetermined condition, the predetermined condition being a passage of time.

6. The system of claim 1, wherein the mobile electronic device is configured to receive instructions for disabling one or more functions of the mobile electronic device.

7. The system of claim 1, wherein the pin extends through the front panel.

8. The system of claim 1, wherein portions of the lock are visible from opposing external sides of the case when the case is in an open position.

9. The system of claim 2, wherein the first and second plates are magnetic and configured to at least partially secure the opening.

* * * * *